United States Patent [19]
Frey et al.

[11] Patent Number: 5,784,197
[45] Date of Patent: Jul. 21, 1998

[54] ULTRA-FLEXIBLE RETROREFLECTIVE SHEETING WITH COATED BACK SURFACE

[75] Inventors: Cheryl M. Frey, White Bear Lake; Bruce B. Wilson, Woodbury, both of Minn.

[73] Assignee: Minnesota Mining and Manufacturing Company, St. Paul, Minn.

[21] Appl. No.: 626,707

[22] Filed: Apr. 1, 1996

[51] Int. Cl.$^6$ ................................................ G02B 5/124
[52] U.S. Cl. .................................... 359/530; 359/529
[58] Field of Search ............................ 359/529–530, 359/534–542, 546, 900; 428/195, 200, 323–325; 264/1.1, 1.9; 156/209

[56] References Cited

U.S. PATENT DOCUMENTS

| | | |
|---|---|---|
| 3,176,584 | 4/1965 | De Vries et al. . |
| 3,190,178 | 6/1965 | McKenzie . |
| 3,689,346 | 9/1972 | Rowland ........................... 156/245 |

(List continued on next page.)

FOREIGN PATENT DOCUMENTS

| | | |
|---|---|---|
| 0 306 161 A2 | 3/1989 | European Pat. Off. . |
| 0 306 162 A2 | 3/1989 | European Pat. Off. . |
| 0 370 347 B1 | 5/1990 | European Pat. Off. . |
| 0 508 173 A1 | 10/1992 | European Pat. Off. . |
| 0 672 921 A2 | 9/1995 | European Pat. Off. . |
| 42 11 415 A1 | 10/1993 | Germany . |
| 2 254 826 | 10/1992 | United Kingdom . |
| GB 2 255 044 | 10/1992 | United Kingdom . |
| A 2 267 865 | 12/1993 | United Kingdom . |
| WO 95/11468 | 4/1995 | WIPO . |
| WO95/11464 | 4/1995 | WIPO . |
| WO95/11469 | 4/1995 | WIPO . |
| WO 95/07179 | 3/1996 | WIPO . |

OTHER PUBLICATIONS

N.S. Allen et al., "UV and electron Beam Curable Pre-Polymers and Diluent Monomers: Classification, Preparation and Properties" in *Radiation Curing in Polymer Science and Technology—vol. I, Fundamentals and Methods*; J.P. Fouassier et al., Eds.; Elsevier Applied Science: London; Chap. 5, pp. 225–261 (1993).

*Paint and Surface Coatings, Theory and Practice*; R. Lambourne, Ed.; Ellis Horwood: New York; pp. 58–110 (1987).

*Radiation Curing Primer I: Inks, Coatings and Adhesive*; C. Kallendorf, Ed.; RadTech International North America: Northbrook, II; Chap. 4, pp. 45–53 (1990).

R.P. Eckberg, "UV Cure of Epoxysiloxanes" in *Radiation Curing in Polymer Science & Technology*; vol. IV; Fouasser et al., Eds.; Elsevier: New York; Chap.2, pp. 19–49 (1993).

S. Peeters, "Overview of Dual–Cure and Hybrid–Cure Systems in Radiation Curing" in *Radiation Curing in Polymer Science and Technology*; vol. III; Fouasser et al., Ed.; Elsevier: New York; Chap.6, pp. 177–217 (1993).

A. Priola et al., "Factors Influencing the Adhesion Properties of Radiation Curable Coatings on Different Substrates", $XIII^{th}$ International Conference in Organic Coatings Science and Technology, 303–318, Jul. 1987.

*Federation Series on Coatings Technology: Radiation Cured Coatings*; Federation of Societies for Coatings Technology: Philadelphia; pp. 7–13 and 24 (Jun. 1986).

"Standard Test Methods for Tensile Properties of Thin Plastic Sheeting", ASTM Designation: D 882–75b, 359–365 (Jan. 1976).

(List continued on next page.)

*Primary Examiner*—James Phan
*Attorney, Agent, or Firm*—Robert H. Jordan

[57] ABSTRACT

A retroreflective article comprising an ultra-flexible structured retroreflective sheeting having a front surface and a back surface, the sheeting retroreflecting light entering through the front surface, wherein the sheeting comprises an overlay film, a two-dimensional array of substantially independent structured elements, the structured elements bonded to the overlay film, and a sealing film forming the back surface of the sheeting and bonded to the overlay film between the structured elements; a plurality of indentations in the sealing film; and a seal coat located on the sealing film, wherein the seal coat at least partially fills the indentations in the sealing film.

32 Claims, 1 Drawing Sheet

U.S. PATENT DOCUMENTS

| | | | |
|---|---|---|---|
| 3,712,706 | 1/1973 | Stamm. | |
| 3,810,804 | 5/1974 | Rowland | 156/245 |
| 3,811,983 | 5/1974 | Rowland | 156/245 |
| 3,924,929 | 12/1975 | Holmen et al.. | |
| 4,025,159 | 5/1977 | McGrath. | |
| 4,111,876 | 9/1978 | Bailey et al.. | |
| 4,123,140 | 10/1978 | Ryan et al.. | |
| 4,202,600 | 5/1980 | Burke et al.. | |
| 4,202,948 | 5/1980 | Peascoe | 525/70 |
| 4,243,618 | 1/1981 | Van Arnam | 264/1 |
| 4,327,130 | 4/1982 | Pipkin | 427/209 |
| 4,332,437 | 6/1982 | Searight et al.. | |
| 4,332,847 | 6/1982 | Rowland | 428/156 |
| 4,345,543 | 8/1982 | Pipkin | 118/106 |
| 4,349,598 | 9/1982 | White | 428/161 |
| 4,387,124 | 6/1983 | Pipkin | 427/356 |
| 4,391,948 | 7/1983 | Falk et al. | 525/57 |
| 4,393,171 | 7/1983 | Bracke et al. | 525/309 |
| 4,393,172 | 7/1983 | Lindner et al. | 525/310 |
| 4,418,120 | 11/1983 | Kealy et al. | 428/343 |
| 4,436,871 | 3/1984 | Staas | 525/64 |
| 4,438,171 | 3/1984 | Wefer | 428/215 |
| 4,440,825 | 4/1984 | Paddock | 428/318.6 |
| 4,442,144 | 4/1984 | Pipkin | 427/355 |
| 4,444,840 | 4/1984 | Wefer | 428/339 |
| 4,444,841 | 4/1984 | Wheeler | 428/339 |
| 4,522,964 | 6/1985 | Lindner et al. | 524/71 |
| 4,528,328 | 7/1985 | Ranade et al. | 525/71 |
| 4,537,933 | 8/1985 | Walker et al. | 525/71 |
| 4,562,229 | 12/1985 | Walker et al. | 525/71 |
| 4,576,850 | 3/1986 | Martens | 428/156 |
| 4,576,860 | 3/1986 | Fink et al. | 428/314.4 |
| 4,587,297 | 5/1986 | Walker et al. | 525/64 |
| 4,588,258 | 5/1986 | Hoopman. | |
| 4,601,861 | 7/1986 | Pricone et al. | 264/1.6 |
| 4,652,274 | 3/1987 | Boettcher et al. | 51/298 |
| 4,653,854 | 3/1987 | Miyata. | |
| 4,672,089 | 6/1987 | Pricone et al. | 524/354 |
| 4,731,414 | 3/1988 | Ting | 525/71 |
| 4,751,138 | 6/1988 | Tumey et al. | 428/323 |
| 4,775,219 | 10/1988 | Appeldorn et al.. | |
| 4,801,193 | 1/1989 | Martia. | |
| 4,831,079 | 5/1989 | Ting | 525/71 |
| 4,880,554 | 11/1989 | Newman et al. | 525/67 |
| 4,880,875 | 11/1989 | Wassmuth et al. | 525/67 |
| 4,885,209 | 12/1989 | Lindner et al. | 428/420 |
| 4,885,335 | 12/1989 | Gallucci et al. | 525/67 |
| 4,894,416 | 1/1990 | Gallucci | 525/74 |
| 4,895,428 | 1/1990 | Nelson et al.. | |
| 4,903,440 | 2/1990 | Larson et al. | 51/298 |
| 4,983,436 | 1/1991 | Bailey et al. | 428/40 |
| 4,985,340 | 1/1991 | Palazzoto et al. | 430/270 |
| 5,055,113 | 10/1991 | Larson et al | 51/298 |
| 5,064,272 | 11/1991 | Bailey et al. | 359/541 |
| 5,066,098 | 11/1991 | Kult et al. | 359/540 |
| 5,068,285 | 11/1991 | Laughner | 525/67 |
| 5,070,142 | 12/1991 | Giles, Jr. et al. | 525/66 |
| 5,070,665 | 12/1991 | Marrin et al. | 52/239 |
| 5,082,897 | 1/1992 | Udipi | 525/67 |
| 5,104,934 | 4/1992 | Udipi | 525/67 |
| 5,106,919 | 4/1992 | Canova et al. | 525/234 |
| 5,117,304 | 5/1992 | Huang et al. | 359/529 |
| 5,120,788 | 6/1992 | Seitz et al. | 525/85 |
| 5,162,423 | 11/1992 | Neumann et al. | 524/504 |
| 5,196,480 | 3/1993 | Seitz et al. | 525/71 |
| 5,236,472 | 8/1993 | Kirk et al. | 51/298 |
| 5,272,562 | 12/1993 | Coderre | 359/529 |
| 5,306,548 | 4/1994 | Zabrocki et al. | 428/215 |
| 5,310,436 | 5/1994 | Pricone et al. | 156/209 |
| 5,450,235 | 9/1995 | Smith et al. | 359/529 |
| 5,491,586 | 2/1996 | Phillips | 359/530 |

OTHER PUBLICATIONS

W.L. Hensley et al. in *Federation Series On Coating Technology: Amino Resins in Coatings*; Federation of Societies for Coatings Technology: Philadelphia; pp. 5–31 (Dec. 1969).

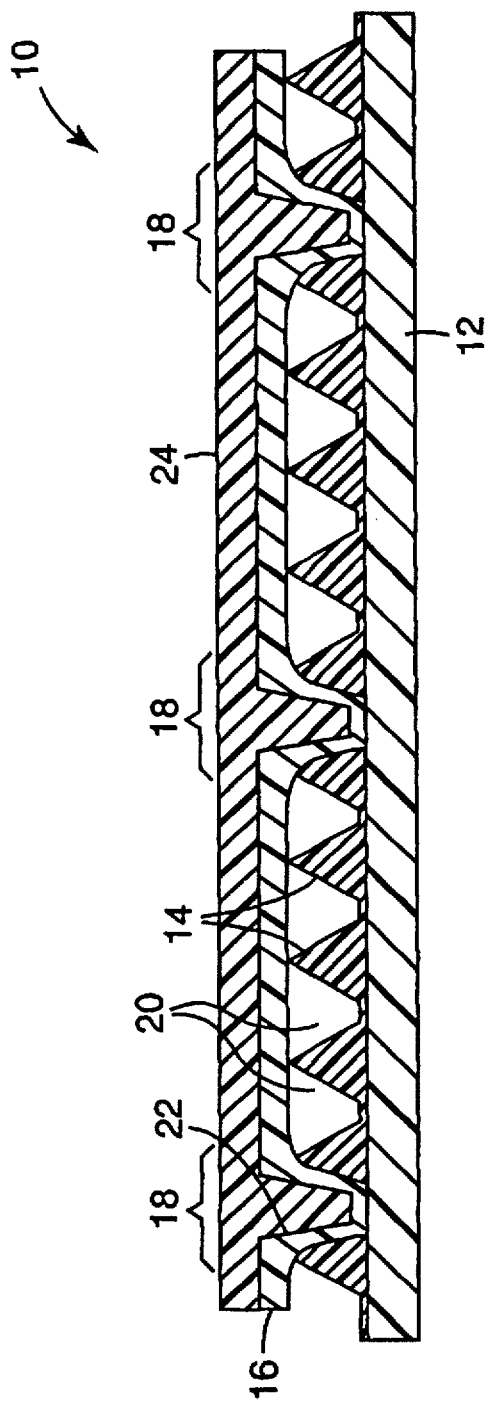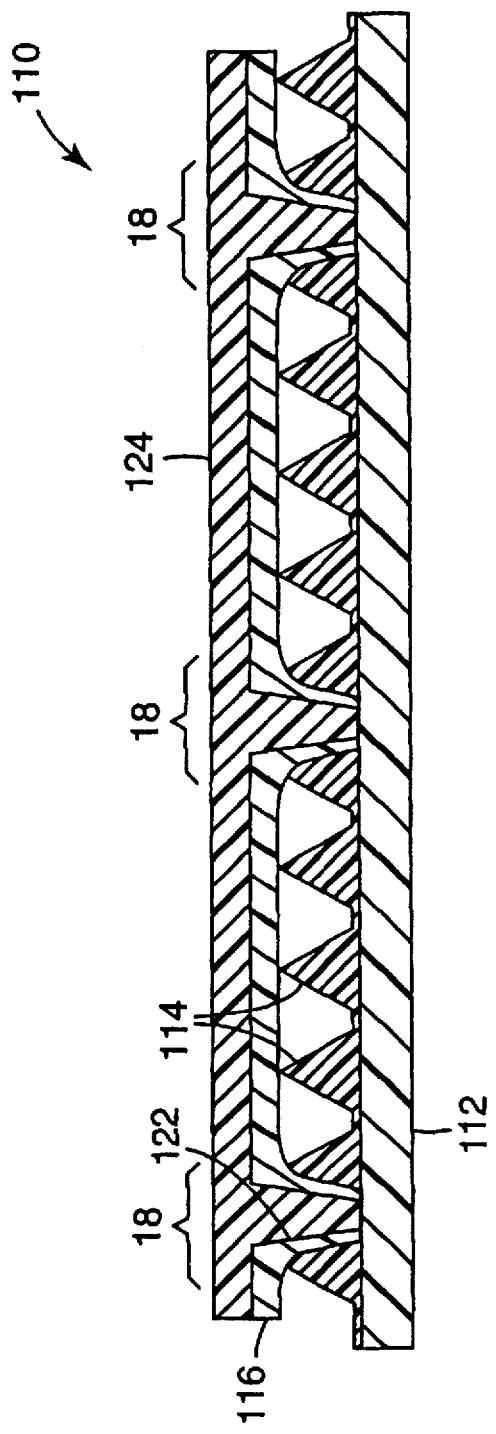

ULTRA-FLEXIBLE RETROREFLECTIVE SHEETING WITH COATED BACK SURFACE

FIELD OF THE INVENTION

This invention pertains to ultra-flexible retroreflective sheetings and methods of making the same.

BACKGROUND OF THE INVENTION

Retroreflective sheeting has the ability to redirect incident light towards its originating source. This advantageous property has led to the widespread use of retroreflective sheeting on a variety of articles. Very often the retroreflective sheetings are used on flat, inflexible articles, for example, road signs and barricades. In many situations it is desirable, however, to provide the highly effective retroreflectivity associated with cube-corner retroreflective sheetings on flexible articles, for example, tarpaulins, safety vests, etc.

The ability to make an effective cube-corner retroreflective sheeting that was also flexible was hampered by the need to provide a land between the cube-corner elements making up the cube-corner film portion of the retroreflective sheeting. The land was formed during manufacture of the cube-corner film and functioned to hold the cube-corner elements in the proper orientation during manufacture of the cube-corner retroreflective sheeting. That land was typically made of the same, relatively rigid materials used to manufacture the cube-corner elements. As a result, the land was also rigid and hindered the ability of the finished sheeting to flex with the suppleness required for application to flexible substrates.

Many different approaches have been taken to produce flexible retroreflective cube-corner sheeting. One example is discussed in U.S. Pat. No. 5,450,235 (Smith et al.). One approach at producing an ultra-flexible cube-corner retroreflective sheeting is discussed in PCT Publication No. WO 95/11464, published 27 Apr. 1995. The sheeting described in that reference is produced with a minimal land or no land at all, resulting in an ultra-flexible cube-corner retroreflective sheeting. Any land provided in these films is fractured during manufacture, resulting in a two-dimensional array of substantially independent cube-corner elements. Another approach at providing a flexible cube-corner retroreflective sheeting is described generally in U.S. Pat. No. 5,491,586 (Phillips).

Like other retroreflective sheetings, a sealing film is preferably used to protect the cube-corner elements of the flexible and ultra-flexible retroreflective sheetings from degradation and dirt and to ensure a hermetic seal. It is also used to preserve the air space around the cube-corner elements to foster total internal reflection by providing the needed refractive index differential at the surfaces of the cube-corner elements.

Ultraflexible cube-corner sheeting as described in PCT Application No. WO 95/11464 contains radiation cured or "thermoset" cubes. The sealing film is attached to the overlay film using a heated embossing tool and/or ultrasonic energy to create a cellular pattern (i.e., cells). This bonding occurs through fractures in the "minimal" land. The embossing typically leaves the retroreflective sheetings with uneven back surfaces. That uneven back surface can provide the opportunity for humidity-induced construction buckling when the retroreflective sheeting is attached to a substrate because the indentations in the back surface provide channels into which moisture travels. After the moisture is in place between the sheeting and the substrate, expansion and contraction caused by temperature variations can cause localized delamination of the sheeting from the substrate. Although adhesives typically used to attach the sheeting to the substrate can, to some extent, fill in the indentations and reduce moisture penetration, many do not have sufficient compliance or flexibility to do so completely.

Another disadvantage of embossed retroreflective sheetings is that the indentations formed in the sheeting can weaken the sheeting components and/or serve as stress concentrators. As a result, the sheetings may fail in peel tests at the indentations formed during embossing.

In ultraflexible cube-corner sheeting, the sealing film must be thick enough to provide sufficient mass to ensure the hermeticity of the bonds between the sealing film and the overlay layer. As a result, the sealing film thickness is typically equal to or greater than the height of the cube-corner elements and sufficiently thick to provide enough material to flow into the channels between the cube-corner elements and to bond with the overlay without forming holes that would destroy the hermeticity of the cells. Thicker sealing films, however, can reduce the flexibility of the sheeting and increase the material cost.

SUMMARY OF THE INVENTION

The present invention provides a retroreflective article comprising an ultra-flexible structured (e.g., cube-corner) retroreflective sheeting having a front surface and a back surface, the sheeting retroreflecting light entering through the front surface, wherein the sheeting comprises an overlay film, a two-dimensional array of substantially independent structured (e.g., cube-corner) elements bonded to the overlay film, and a sealing film forming the back surface of the sheeting and bonded to the overlay film between the structured elements; a plurality of indentations in the sealing film; and a seal coat located on the sealing film, wherein the seal coat material at least partially fills the indentations in the sealing film.

In still other embodiments, the sealing film comprises a thermoplastic polymer and has a ductile yield of at least about 20%. In other embodiments, the thermoplastic polymer can be selected from the group consisting of cast polyethers, cast polyesters, cast polyamides, ionomeric ethylene copolymers, plasticized vinyl halide polymers, poly-alpha-olefins, ethylene-propylene-diene copolymers such as ethylene-propylene-nonconjugated diene ternary copolymers grafted with a mixture of styrene and acrylonitrile, as well as other styrene-acrylonitrile copolymers such as styrene-acrylonitrile graft copolymers, acrylonitrile-butadiene-styrene graft copolymers, and extractable styrene-acrylonitrile copolymers, and combinations or blends thereof.

Preferred seal coats are prepared from a seal coat precursor comprising radiation curable components. Some preferred seal coat precursors comprise a cationic curable resin, a free radical curable resin, or mixtures thereof. In yet another aspect, the radiation curable seal coat precursor comprises a reactive diluent and a film former, each of which preferably comprises an acrylate.

The present invention also includes methods of manufacturing the various embodiments of the retroreflective sheetings according to the present invention.

The above and other features of the invention are more fully shown and described in the drawings and detailed description of this invention, where like reference numerals are used to represent similar parts. It is to be understood, however, that the description and drawings (which are not to scale) are for the purposes of illustration only and should not be read in a manner that would unduly limit the scope of this invention.

BRIEF DESCRIPTION OF THE DRAWINGS

FIG. 1 is a cross-sectional view of one embodiment of an ultraflexible structured retroreflective sheeting according to the present invention.

FIG. 2 is a cross-sectional view of an alternative embodiment of an ultra-flexible structured retroreflective sheeting according to the present invention.

DETAILED DESCRIPTION OF THE INVENTION

In describing preferred embodiments of the invention, specific terminology will be used for the sake of clarity. The invention, however, is not intended to be limited to the specific terms so selected, and it is to be understood that each term so selected includes all technical equivalents that operate similarly. Furthermore, the drawings referred to below are merely schematic, showing the relative relationships (not to scale) between the elements of the depicted structures.

Ultra-flexible structured retroreflective sheetings according to the present invention include a structured retroreflective film comprising a multitude of structured elements, and a sealing film attached to the structured elements to create a cellular pattern. As used herein, "structured retroreflective sheeting" and its variations include all structured film geometries used for retroreflection of incident light. One typical example of a structured retroreflective sheeting is cube-corner retroreflective sheeting and that variation is used in many of the discussions below, but it should be understood that the present invention includes retroreflective sheetings incorporating other geometries in addition to typical cube-corner constructions.

Referring now to FIG. 1, the retroreflective sheetings of the present invention start with ultra-flexible retroreflective structured sheeting 10 similar to those generally described in the references discussed in the background section above. Although the sheetings described in those references are useful, it should be understood that the present invention can be used in conjunction with any ultraflexible retroreflective structured sheeting 10 that includes a structured retroreflective film comprising structured elements 14 located on a flexible overlay film 12 and a sealing film 16 bonded to the overlay film 14 in bonded areas 18 using a process that leaves indentations 22 in the sealing film 16. Typically, the structured elements 14 are substantially independent of each other to allow the sheeting 10 to flex as described, for example, in PCT Application No. WO 95/11464. Also as disclosed therein, the structured elements 14 are typically comprised of a first polymer having the desired optical properties, while the overlay film 12 is comprised of a second polymer chosen for its flexibility.

The bonds 18 between the sealing film 16 and the overlay film 12 are typically formed to provide an array of discrete cells common to most cube-corner retroreflective sheetings. Examples of such arrays of cells can be found in, for example, U.S. Pat. Nos. 3,924,929 (Holmen et al.) and 4,025,159 (McGrath).

The sealing film 16 protects the cube-corner elements 14 from environmental degradation and may also provide additional mechanical integrity to the retroreflective sheeting 10. In addition, the sealing film 16 maintains the desired air space 20 about most of the cube-corner elements 14. That air space 20 provides the refractive index differential required to foster total internal reflection in the cube-corner elements 14.

The indentations 22 in the sealing film 16 can adversely affect the peel strength of the sheeting 10 and may also be a source of potential humidity-induced construction buckling. In sheeting 10, however, a seal coat precursor is used to form a seal coat layer 24 on the back surface of the sheeting 10 to at least partially fill the indentations 22 and, preferably, also to increase the peel strength of the sheeting 10. The seal coat precursors according to the present invention are described more fully below. After the seal coat layer 24 has been applied and solidified, the sheeting 10 can be fastened or attached to a suitable substrate or other article as desired by any means suitable for the given application.

Suitable polymeric materials used in the sealing film 16 are thermoplastic materials that are generally resistant to degradation by weathering (e.g., UV light, moisture) so that the retroreflective sheeting can be used for long-term outdoor applications. Because it may also serve as a substrate for coating with a seal coat and/or adhesive, the thermoplastic polymeric material should be chosen such that it adheres well to the seal coat and/or adhesive. If an opaque or colored sealing film is desired, the polymeric material used for the sealing film should also be compatible with various pigments and/or dyes. Herein, the term "thermoplastic" is used in its conventional sense to mean a material that softens when exposed to heat and returns to its original condition when cooled.

Suitable thermoplastic polymers for use in the sealing film generally retain their physical integrity at the temperatures at which the sealing film is applied to the structured retroreflective film. By this it is meant that the sealing film is only melted at the bonding sites between the sealing film and the overlay film. It also preferably has a ductile yield of at least about 20%, and more preferably at least about 50%, prior to ultimate failure (i.e., permanent deformation). Particularly preferred materials have a ductile yield of at least about 70% prior to ultimate failure. That is, upon ultimate failure, the sealing film will stretch and remain permanently deformed as a result of the forces generated from stretching. As a result, the sealing film of the present invention typically has less contact with the structured element tips (e.g., cube-corner tips) than in constructions having a less ductile sealing film. The reduced contact maintains the air space about the structured elements to foster TIR and reduce leakage through the elements. This provides a more efficient retroreflector, as evidenced by increased "brightness" of the sheeting construction. It also provides for increased transparency in the seal legs. Such sealing films are referred to herein as "yielding" sealing films. For comparison, an example of a nonyielding sealing film is a biaxially oriented polyethylene terephthalate film.

The preferred polymers used for sealing film 16 also preferably have a low modulus of elasticity so that the sealing film 16 does not significantly degrade the flexibility of the sheeting 10 as would a sealing film with a higher modulus. The term "modulus of elasticity" as used herein means the elastic modulus as determined according to ASTM D882-75b using Static Weighing Method A with a 12.5 centimeter initial grip separation, a 2.5 centimeter sample width, and a 2.5 centimeter/minute rate of grip separation. It is preferred that the modulus of elasticity of the sealing film 16 be about $13 \times 10^8$ Pascals or less, preferably between about $1 \times 10^5$ and about $13 \times 10^8$ Pascals.

Although it is preferred that the seal coat layer 24 form a generally planar surface as depicted in FIG. 1, it should be understood that the seal coat according to the present invention may only partially fill the indentation 22. Although a completely planar back surface is ideal, any reduction in the depth of the indentation 22 by seal coat layer 24 will help to reduce humidity-induced construction buckling by at least partially blocking the passage of moisture between the sheeting 10 and a substrate.

FIG. 2 schematically depicts a cross-section of an alternative embodiment of a structured retroreflective sheeting 110 of the present invention. In this embodiment, structured retroreflective sheeting 110 comprises an overlay film 112 to which a plurality of cube-corner elements 114 are attached. No land is depicted between the cube-corner elements 114, but it should be understood that some minimal land may exist during manufacture of the cube-corner elements 114 and that land may be fractured to provide the desired degree of flexibility in the sheeting 110. Light enters the overlay film 112 and then the cube-corner elements 114, where it is reflected and returned to provide the desired retroreflection.

A layer of sealing film 116 is bonded to the overlay film 112 as shown at bonds 118. The bonds 118 are typically formed to provide an array of discrete cells as discussed with respect to the embodiment depicted in FIG. 1.

The processes typically used to bond the sealing film 116 to the overlay film 112 results in the formation of indentations 122 in the back surface of the sealing film 116, i.e., the surface opposite the overlay film 112. Those indentations 122 are the source of potential humidity-induced construction buckling and may also adversely affect the peel strength of the sheeting 110 as discussed above. In sheeting 110, however, a seal coat layer 124 is applied to the back surface of the sheeting 110 to at least partially fill the indentations 122 and may also increase the peel strength of the sheeting 110.

The primary difference between the sheeting 10 in FIG. 1 and the sheeting 110 in FIG. 2 is that the sealing film may not completely cover the overlay film 112 and cube-corner elements 114 in the areas of bonds 118. As a result, the overlay film 114 may be exposed in the bonds 118 to the later-applied seal coat material 124, resulting in direct adhesion of the seal coat to the overlay. As discussed above, because the preferred sealing film 116 is a yielding film, the cells formed between adjacent bonds 118 preferably remain sealed even though the sealing film 116 itself has been perforated in the bonds 118. This allows for back coating with a seal coat without leakage of the seal coat through perforations in the seal film 116 in the bonding areas 118.

A further advantage of the construction depicted in FIG. 2 is that the seal coat precursor used to form seal coat 124 can now contact the overlay film 112 in addition to the sealing film 116. That additional contact can provide bonds 118 with additional strength, thereby increasing the peel strength of the sheeting 110. In some instances, that additional bond strength can also change the locus of failure in the peel strength tests. In addition, the hermeticity of the cells formed in the sheeting 110 may also be increased by the seal coat layer 124. In both cases, the opportunity exists to replace a thicker (i.e., more expensive and/or less flexible) sealing film with a thinner film.

Sealing Film

Examples of thermoplastic polymers suitable for use in the yielding sealing film include, but are not limited to, materials from the following classes: cast polyethers; cast polyesters; cast polyamides; ionomeric ethylene copolymers such as poly(ethylene-co-methacrylic acid) with sodium or zinc ions, which are available under the trade designations SURLYN-8920 and SURLYN-9910 from E.I. DuPont de Nemours, Wilmington, Del.; plasticized vinyl halide polymers; poly-alpha-olefins; polymers of ethylene-propylene-diene monomers ("EPDM"), including ethylene-propylene-nonconjugated diene ternary copolymers grafted with a mixture of styrene and acrylonitrile (also known as acrylonitrile EPDM styrene or "AES"); styrene-acrylonitrile ("SAN") copolymers including graft rubber compositions such as those comprising a crosslinked acrylate rubber substrate (e.g., butyl acrylate) grafted with styrene and acrylonitrile or derivatives thereof (e.g., alpha-methyl styrene and methacrylonitrile) known as "ASA" or acrylate-styrene-acrylonitrile copolymers, and those comprising a substrate of butadiene or copolymers of butadiene and styrene or acrylonitrile grafted with styrene or acrylonitrile or derivatives thereof (e.g., alpha-methyl styrene and methacrylonitrile) known as "ABS" or acrylonitrile-butadiene-styrene copolymers, as well as extractable styrene-acrylonitrile copolymers (i.e., nongraft copolymers) also typically referred to as "ABS" polymers; and combinations or blends thereof. As used herein, the term "copolymer" should be understood as including terpolymer, tetrapolymer, etc.

Preferred polymers for use in the sealing film are within the styrenic family of multiphase copolymer resins (i.e., a multiphase styrenic thermoplastic copolymers of immiscible monomers) referred to above as AES, ASA, and ABS, and combinations or blends thereof. Such polymers are disclosed in U.S. Pat. Nos. 4,444,841 (Wheeler), 4,202,948 (Peascoe), and 5,306,548 (Zabrocki et al.). The blends may be in the form of a multilayered film where each layer is a different resin, or physical blends of the polymers which are then extruded into a single film. For example, ASA and/or AES resins can be coextruded over ABS. Multiphase AES, ASA, and ABS resins are used in a variety of applications in which they are used alone, together, or in combination with a variety of other resins to make moldable products such as garden furniture, boat hulls, window frames, and automotive body parts, for example.

Particularly preferred polymers for use in the sealing film are the multiphase AES and ASA resins, and combinations or blends thereof. Such polymers contribute to retention of the peel strength of the retroreflective sheeting with time. The AES resins, which contain acrylonitrile, EPDM, and styrene, are particularly desirable because they can adhere to a wide variety of polymer types when melted, such as polycarbonates, polymethylmethacrylates, polystyrene, urethane acrylics, and the like. Commercially available AES and ASA resins, or combinations thereof, include, for example, those available under the trade designations ROVEL from Dow Chemical Company, Midland, Mich., and LORAN S 757 and 797 from BASF Aktiengesellschaft, Ludwigshafen, Fed. Rep. of Germany), CENTREX 833 and 401 from Bayer Plastics, Springfield, Conn., GELOY from General Electric Company, Selkirk, N.Y., VITAX from Hitachi Chemical Company, Tokyo, Japan. It is believed that some commercially available AES and/or ASA materials also have ABS blended therein. Commercially available SAN resins include those available under the trade designation TYRIL from Dow Chemical, Midland, Mich. Commercially available ABS resins include those available under the trade designation CYOLAC such as CYOLAC GPX 3800 from General Electric, Pittsfield, Mass.

The sealing film can also be prepared from a blend of one or more of the above-listed materials that form a yielding sealing film and one or more thermoplastic polymers that themselves produce nonyielding sealing films (i.e., nonductile sealing films, which can be elastomeric or brittle materials). Examples of such thermoplastic polymers that can be blended with the above-listed yielding materials include, but are not limited to, materials from the following classes: biaxially oriented polyethers; biaxially oriented polyesters; biaxially oriented polyamides; acrylic polymers such as poly(methyl methacrylate); polycarbonates; polyimides; cellulosics such as cellulose acetate, cellulose (acetate-co-butyrate), cellulose nitrate; polyesters such as poly(butylene terephthalate), poly(ethylene terephthalate); fluoropolymers such as poly(chlorofluoroethylene), poly(vinylidene fluoride); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); aliphatic and aromatic polyurethanes; poly(phenylene ether); poly(phenylene sulfide); atactic poly(styrene); cast syndiotactic polystyrene; polysulfone; silicone modified polymers (i.e., polymers that contain a small weight percent (less than 10 weight percent) of silicone) such as silicone polyamide and silicone polycarbonate; acid functional polyethylene copolymers such as poly(ethylene-co-acrylic acid) and poly(ethylene-co-methacrylic acid), poly(ethylene-co-maleic acid), and poly(ethylene-co-fumaric acid); fluorine modified polymers such as perfluoropoly(ethyleneterephthalate); and mixtures of the above polymers such as a polyimide and acrylic polymer blend, and a poly(methylmethacrylate) and fluoropolymer blend. Such "nonyielding" thermoplastic polymers can be combined with the yielding thermoplastic polymers in any amount desired, as long as the resultant film preferably has a ductile yield of at least about 20%, and more preferably at least about 50%, prior to ultimate failure. Examples of a combination of a yielding/nonyielding material are polycarbonate/ABS resins such as those available under the trade designations PULSE 1350 and 1370 from Dow Chemical Company, Midland, Mich.

These polymer compositions may include other ingredients including UV stabilizers and antioxidants such as those available from Ciba-Geigy Corp., Ardsley, N.Y., under the trade designation IRGANOX, fillers such as talc, reinforcing agents such as MICA or glass fibers, fire retardants, antistatic agents, mold release agents such as fatty acid esters available under the trade designations LOXIL G-715 or LOXIL G-40 from Henkel Corp., Hoboken, N.J., or WAX E from Hoechst Celanese Corp., Charlotte, N.C. Colorants, such as pigments and dyes, can also be incorporated into the polymer compositions of the sealing film. Examples of colorants include rutile $TiO_2$ pigment available under the trade designation R960 from DuPont de Nemours, Wilmington, Del., iron oxide pigments, carbon black, cadmium sulfide, and copper phthalocyanine. Often, the above-identified polymers are commercially available with one or more of these additives, particularly pigments and stabilizers. Typically, such additives are used in amounts to impart desired characteristics. Preferably, they are used in amounts of about 0.02–20 wt-%, and more preferably about 0.2–10 wt-%, based on the total weight of the polymer composition.

Typically, the thickness of the sealing film is less than the height of the structured elements. Typically, the height of the structured elements is less than about 500 micrometers, and preferably less than about 200 micrometers. Typically, the sealing film thickness is less than about 250 micrometers, preferably less than about 200 micrometers, and more preferably, about 25–80 micrometers. The minimum thickness of the sealing film is generally dictated by extrusion techniques, and is typically greater than about 10 micrometers, and preferably, greater than about 25 micrometers. Such thin films can be prepared, for example, using the extrusion process detailed in copending U.S. patent application Ser. No. 08/626,709, entitled EXTRUDING THIN MULTIPHASE POLYMER FILMS (Attorney Docket No. 52496USA3A), filed on even date herewith.

Seal Coat

Seal coat 118 (FIG. 2) is an oligomeric or polymeric material used to coat sealing film 116. The seal coat is prepared from a seal coat precursor that is applied as a fluid capable of flowing sufficiently so as to be coatable, and then solidifying to form a film. The solidification can be achieved by curing (i.e., polymerizing and/or crosslinking) and/or by drying (e.g., driving off a liquid), or simply upon cooling. The seal coat precursor can be an organic solvent-borne, water-borne, or 100% solids (i.e., a substantially solvent-free) composition. That is, the seal coat may be formed from a 100% solids formulation or it may be coated out of a solvent (e.g., a ketone, tetrahydrofuran, or water) with subsequent drying and/or curing. Preferably, the seal coat precursor is a 100% solids formulation, which is substantially solvent-free (i.e., less than about 1 wt-%). By this it is meant that there is less than about 1 wt-% nonreactive diluent (as defined below) present in the seal coat precursor. Thus, the seal coat precursor can simply dry to form a coating, or the components of the seal coat precursor can polymerize and/or crosslink using a wide variety of curing mechanisms (e.g., oxidative cure as a result of oxygen in the air, thermal cure, moisture cure, high energy radiation cure, condensation polymerization, addition polymerization, and combinations thereof).

A preferred seal coat precursor is one that is capable of irreversibly forming a cured oligomeric/polymeric material and is often used interchangeably with the term "thermosetting" precursor. The term "thermosetting" precursor is used herein to refer to reactive systems that irreversibly cure upon the application of heat and/or other sources of energy, such as E-beam, ultraviolet, visible, etc., or with time upon the addition of a chemical catalyst, moisture, and the like. The term "reactive" means that the components of the seal coat precursor react with each other (or self react) either by polymerizing, crosslinking, or both, using any of the mechanisms listed above.

Preferred embodiments of the present invention include both a sealing film and a seal coat. The sealing film uses a thermoplastic material to form a bond with the structured film and seal in air to retain TIR, whereas the seal coat preferably uses a reactive system to enhance the bonding mechanism and provide a better seal. Although U.S. Pat. No. 4,025,159 (McGrath) teaches that a more durable bond can be formed with a heat seal mechanism combined with a reactive seal mechanism, both mechanisms occur in one layer of material. This does not allow for the versatility of the present invention, which separates the thermal seal mechanism from the reactive seal mechanism into separate layers. That is, by separately optimizing the sealing film and seal coat formulations, opacity, flexibility, durability, strength, etc., of the retroreflective sheeting can be varied for the desired end use. It should be understood, however, that the binder material used in U.S. Pat. No. 4,025,159 (McGrath), such as the thermoplastic acrylic terpolymer (methyl methacrylate/ethyl acrylate/isooctyl acrylate) and tetraethylene glycol diacrylate, can be used to form the seal coat in the present invention, as long as a thermoplastic sealing film, particularly a yielding sealing film, is used in combination with the seal coat.

Thus, the seal coat can perform a variety of functions when used in combination with a sealing film. For example, it can impart additional durability, strength, and opacity to the sealing film. The seal coat precursor preferably has a viscosity that allows it to flow into the indentations in the seal legs, and thereby increase the opacity in this area, as well as bond to the sealing film and/or overlay, thus enhancing the hermetic seal of the construction. When a yielding sealing film forms a hermetic seal with the structured film, the seal coat does not leak through the perforations in the sealing film and flood the adjacent cube area. The seal coat may also help fill in the indentations caused by embossing the sealing film to the overlay film, and may provide a more compatible layer for the adhesive composition. The seal coat also preferably has a relatively low modulus of elasticity to minimize any negative impact on the flexibility of the retroreflective sheeting.

By smoothing out and filling in any indentations in the sealing film, the seal coat helps to reduce humidity-induced construction buckling in the bonds between the sheeting and a substrate. Although the construction buckling does not affect the performance of the retroreflective sheeting, it can cause localized areas of delamination between the sheeting and the base. The smoother back surface provided by the seal coat, however, can substantially inhibit moisture penetration between the sealing film and/or any adhesive used to bond the sheeting to a sign backing because it reduces or eliminates the pathways used in films which have indentations in the sealing film. This is particularly true when the adhesive used to attach the sealing film to the backing is substantially stiff (i.e., when it does not fill in or otherwise conform to and fill in any indentations).

Components selected for use in the seal coat precursor can be used to enhance durability and weatherability of the retroreflective sheeting. In addition, the seal coat precursor preferably has suitable rheology to both coat the sealing film uniformly and also flow into the indentations. Additional opacity can be obtained by this invention because components of the seal coat precursor can suspend or disperse various pigments at useful concentrations. Depending on the sheeting construction, various components of the seal coat precursor preferably interact with the sealing film and/or overlay materials, particularly in the seal legs, to form a durable bond. The term "interact" refers to a variety of mechanisms of interaction, such as surface roughening, dissolution, or interpenetration of the polymer used in the sealing film and/or overlay. There could also be a covalent interaction (e.g., polymerizing and/or crosslinking) between components of the seal coat precursor and the sealing film and/or overlay. The degree of interaction, however, cannot be so great as to destroy the integrity of the retroreflective sheeting.

The seal coat precursors can include reactive or nonreactive components. Nonreactive seal coat precursors typically include polymers or oligomers dissolved or dispersed in nonreactive volatile liquids, although 100% solids systems can also be used. This can include, for example, a thermoplastic coated out of a solvent or coated as a hot melt, and a latex coated out of water. Although they can be used, nonreactive seal coat precursors are not preferred, however. Typically, nonreactive seal coat precursors involve the use of additional processing steps to form the seal coat, such as the removal of any liquid used. This can subject the sheeting to undesirable thermal stress and produce undesirable emissions. Also, nonreactive seal coat precursors do not irreversibly interact with the sheeting (e.g., the overlay or the sealing film) and thus may not enhance the strength of the construction as much as desired.

Preferably, materials suitable for forming the seal coat are seal coat precursors comprising reactive components, i.e., materials capable of being crosslinked and/or polymerized by a wide variety of mechanisms (e.g., oxidative cure, condensation, moisture cure, radiation or thermal cure of free radical systems, etc., or combinations thereof). Examples include, but are not limited to: amino resins (i.e., aminoplast resins) such as alkylated urea-formaldehyde resins, melamine-formaldehyde resins, and alkylated benzoguanamine-formaldehyde resins; acrylate resins (including acrylates and methacrylates) such as vinyl acrylates, acrylated epoxies, acrylated urethanes, acrylated polyesters, acrylated acrylics, acrylated polyethers, acrylated oils, and acrylated silicones; alkyd resins such as urethane alkyd resins; polyester resins; reactive urethane resins; phenol formaldehyde resins (i.e., phenolic resins) such as resole and novolac resins; phenolic/latex resins; epoxy resins such as bisphenol epoxy resins; isocyanates; isocyanurates; polysiloxane resins including alkylalkoxysilane resins; reactive vinyl resins; and the like. As used herein, "resins" or "resin systems" refer to polydisperse systems containing monomers, oligomers, polymers, or combinations thereof.

Such reactive seal coat precursor components are capable of being cured by a variety of mechanisms (e.g., condensation or addition polymerization) using, for example, thermal energy, radiation energy, etc. Rapidly acting forms of radiation energy (e.g., requiring application for less than five minutes and preferably for less than five seconds) are particularly preferred. Electron beam (E-beam) radiation is especially desired because of its ability to penetrate heavily pigmented coatings, its speed and efficient use of applied energy, and its ease of control. Other useful forms of radiation energy include ultraviolet/visible light, nuclear radiation, infrared, and microwave radiation. Depending on the particular curing mechanism, the seal coat precursor can further include a catalyst, initiator, or curing agent to help initiate and/or accelerate the polymerization and/or crosslinking process.

Reactive seal coat precursor components capable of being cured by thermal energy and/or time with the addition of catalysts include, for example, phenolic resins such as resole and novolac resins; epoxy resins such as bisphenol A epoxy resins; and amino resins such as alkylated urea-formaldehyde resins, melamine-formaldehyde resins, and alkylated benzoguanamine-formaldehyde resins. The seal coat precursors containing reactive components such as these can include free radical thermal initiators, acid catalysts, etc., depending on the resin system. Examples of thermal free radical initiators include peroxides such as benzoyl peroxide and azo compounds. Typically, such reactive seal coat precursor components need temperatures greater than room temperature (i.e., 25°–30° C.) to cure, although room-temperature curable systems are known.

Resole phenolic resins have a molar ratio of formaldehyde to phenol, based upon weight, of greater than or equal to about 1:1, typically about 1.5:1.0 to about 3.0:1.0. Novolac resins have a molar ratio of formaldehyde to phenol, based upon weight, of less than about 1:1. Examples of commercially available phenolic resins include those known by the designations DUREZ and VARCUM from Occidental Chemicals Corp., Dallas, Tex.; RESINOX from Monsanto, St. Louis, Mo.; and AEROFENE and AEROTAP from Ashland Chemical Co., Columbus, Ohio.

Epoxy resins have an oxirane and are polymerized by ring opening. They can vary greatly in the nature of their backbones and substituent groups. For example, the backbone may be of any type normally associated with epoxy resins, and the substituent groups may be any group free of an active hydrogen atom that is reactive with an oxirane ring at room temperature. Representative examples of acceptable substituents include halogens, ester groups, ether groups, sulfonate groups, siloxane groups, nitro groups, and phosphate groups. One of the most commonly available epoxy resins is the reaction product of diphenylol propane (i.e., bisphenol A) and epichlorhydrin to form 2,2-bis[4-(2,3-epoxypropoxy)phenyl]propane (a diglycidyl ether of bisphenol A). Such materials are commercially available under the trade designations EPON (e.g., EPON 828, 1004, and 1001F) from Shell Chemical Co., and DER (e.g., DER 331, 332, and 334) from Dow Chemical Co., Midland, Mich. Other suitable epoxy resins include glycidyl ethers of phenol formaldehyde novolac available under the trade designation DEN (e.g., DEN 431 and 428) from Dow Chemical Co.

Amino resins (i.e., aminoplast resins) are the reaction product of formaldehyde and an amine. The amine is typically urea or melamine. The most common amino resins are the alkylated urea-formaldehyde resins and melamine-formaldehyde resins, although alkylated benzoguanamine-formaldehyde resins are also known. Melamine-formaldehyde resins are typically used where outdoor durability and chemical resistance are desired. Typically, however, amino resins are not used by themselves because they tend to be brittle. Thus, they are often combined with other resin systems. For example, they can be combined with alkyds, epoxies, acrylics, or other resins that contain functional groups that will react with the amino resin, to take advantage of the good properties of both resin systems.

More preferred seal coat precursors are those that are curable using radiation. These are referred to herein as radiation curable materials. As used herein, "radiation cure" or "radiation curable" refers to curing mechanisms that involve polymerization and/or crosslinking of resin systems upon exposure to ultraviolet radiation, visible radiation, electron beam radiation, or combinations thereof, optionally with the appropriate catalyst or initiator. Typically, there are two types of radiation cure mechanisms that occur—free radical curing and cationic curing. These usually involve one stage curing or one type of curing mechanism. Mixtures of free radical and cationic materials may also be cured to impart desired properties from both systems. Also possible are dual-cure and hybrid-cure systems, as discussed below.

In cationic systems, cationic photoinitiators react upon exposure to ultraviolet/visible light to decompose to yield an acid catalyst. The acid catalyst propagates a crosslinking reaction via an ionic mechanism. Epoxy resins, particularly cycloaliphatic epoxies, are the most common resins used in cationic curing, although aromatic epoxies and vinyl ether based oligomers can also be used. Furthermore, polyols can be used in cationic curing with epoxies as chain-transfer agents and flexibilizers. Also, epoxysiloxanes as disclosed in Eckberg et al., "UV Cure of Epoxysiloxanes," *Radiation Curing in Polymer Science and Technology: Volume IV, Practical Aspects and Applications*, Fouassier and Rabek, eds., Elsevier Applied Science, NY, Chapter 2, 19–49 (1993) can be cured using a cationic photoinitiator. The cationic photoinitiators include salts of onium cations, such as arylsulfonium salts, as well as organometallic salts. Examples of cationic photoinitiators are disclosed in U.S. Pat. Nos. 4,751,138 (Tumey et al.) and 4,985,340 (Palazzotti), and European Patent Application Nos. 306,161 and 306,162. A suitable photoinitiator for epoxysiloxanes is the photoactive iodonium salt available under the trade designation UV9310C from GE Silicones, Waterford, N.Y.

In free radical systems, radiation provides very fast and controlled generation of highly reactive species that initiate polymerization of unsaturated materials. Examples of free radical curable materials include, but are not limited to, acrylate resins, aminoplast derivatives having pendant alpha,beta-unsaturated carbonyl groups, isocyanurate derivatives having at least one pendant acrylate group, isocyanate derivatives having at least one pendant acrylate group, unsaturated polyesters (e.g., the condensation products of organic diacids and glycols), polyene/thiol/silicone systems, and other ethylenically unsaturated compounds, and mixtures and combinations thereof. Such radiation curable systems are discussed in greater detail in Allen et al., "UV and Electron Beam Curable Pre-Polymers and Diluent Monomers: Classification, Preparation and Properties," *Radiation Curing in Polymer Science and Technology: Volume I, Fundamentals and Methods*, Fouassier and Rabek, eds., Elsevier Applied Science, NY, Chapter 5, 225–262 (1993); *Federation Series on Coatings Technology: Radiation Cured Coatings*, Federation of Societies for Coatings Technology, Philadelphia, Pa., pages 7–13 (1986); and *Radiation Curing Primer I: Inks, Coatings, and Adhesives*, RadTech International North America, Northbrook, Ill., pages 45–53 (1990).

Free radical curable systems can be cured using radiation energy, although they can be cured using thermal energy, as long as there is a source of free radicals in the system (e.g., peroxide or azo compound). Thus, the phrase "radiation curable," and more particularly the phrase "free radical curable," include within their scope systems that also can be cured using thermal energy and that involve a free radical curing mechanism. In contrast, the phrase "radiation cured" refers to systems that have been cured by exposure to radiation energy.

Suitable acrylate resins for use in the present invention include, but are not limited to, acrylated urethanes (i.e., urethane acrylates), acrylated epoxies (i.e., epoxy acrylates), acrylated polyesters (i.e., polyester acrylates), acrylated acrylics, acrylated silicones, acrylated polyethers (i.e., polyether acrylates), vinyl acrylates, and acrylated oils. As used herein, the terms "acrylate" and "acrylate-functional" include both acrylates and methacrylates, whether they be monomers, oligomers, or polymers.

Acrylated urethanes are diacrylate esters of hydroxy terminated NCO extended polyesters or polyethers. They can be aliphatic or aromatic, although acrylated aliphatic urethanes are preferred because they are less susceptible to weathering. Examples of commercially available acrylated urethanes include those known by the trade designations PHOTOMER (e.g., PHOTOMER 6010) from Henkel Corp., Hoboken, N.J.; EBECRYL 220 (hexafunctional aromatic urethane acrylate of molecular weight 1000), EBECRYL 284 (aliphatic urethane diacrylate of 1200 molecular weight diluted with 1,6-hexanediol diacrylate), EBECRYL 4827 (aromatic urethane diacrylate of 1600 molecular weight), EBECRYL 4830 (aliphatic urethane diacrylate of 1200 molecular weight diluted with tetraethylene glycol diacrylate), EBECRYL 6602 (trifunctional aromatic urethane acrylate of 1300 molecular weight diluted with trimethylolpropane ethoxy triacrylate), and EBECRYL 8402 (aliphatic urethane diacrylate of 1000 molecular weight) from UCB Radcure Inc., Smyrna, Ga.; SARTOMER (e.g., SARTOMER 9635, 9645, 9655, 963-B80, 966-A80) from Sartomer Co., West Chester, Pa.; and UVITHANE (e.g., UVITHANE 782) from Morton International, Chicago, Ill.

Acrylated epoxies are diacrylate esters of epoxy resins, such as the diacrylate esters of bisphenol A epoxy resin. Examples of commercially available acrylated epoxies include those known by the trade designations EBECRYL 600 (bisphenol A epoxy diacrylate of 525 molecular weight), EBECRYL 629 (epoxy novolac acrylate of 550 molecular weight), and EBECRYL 860 (epoxidized soya oil acrylate of 1200 molecular weight) from UCB Radcure Inc., Smyrna, Ga.; and PHOTOMER 3016 (bisphenol A epoxy diacrylate), PHOTOMER 3038 (epoxy acrylate/tripropylene glycol diacrylate blend), PHOTOMER 3071 (modified bisphenol A acrylate), etc. from Henkel Corp., Hoboken, N.J.

Acrylated polyesters are the reaction products of acrylic acid with a dibasic acid/aliphatic/diol-based polyester. Examples of commercially available acrylated polyesters include those known by the trade designations PHOTOMER 5007 (hexafunctional acrylate of 2000 molecular weight), PHOTOMER 5018 (tetrafunctional acrylate of 1000 molecular weight), and other acrylated polyesters in the PHOTOMER 5000 series from Henkel Corp., Hoboken, N.J.; and EBECRYL 80 (tetrafunctional modified polyester acrylate of 1000 molecular weight), EBECRYL 450 (fatty acid modified polyester hexaacrylate), and EBECRYL 830 (hexafunctional polyester acrylate of 1500 molecular weight) from UCB Radcure Inc., Smyrna, Ga.

Acrylated acrylics are acrylic oligomers or polymers that have reactive pendant or terminal acrylic acid groups capable of forming free radicals for subsequent reaction. Examples of commercially available acrylated acrylics include those known by the trade designations EBECRYL 745, 754, 767, 1701, and 1755 from UCB Radcure Inc., Smyrna, Ga.

Acrylated silicones, such as room temperature vulcanized silicones, are silicone-based oligomers or polymers that have reactive pendant or terminal acrylic acid groups capable of forming free radicals for subsequent reaction. These and other acrylates are discussed in Allen et al., "UV and Electron Beam Curable Pre-Polymers and Diluent Monomers: Classification, Preparation and Properties," *Radiation Curing in Polymer Science and Technology: Volume I, Fundamentals and Methods*, Fouassier and Rabek, eds., Elsevier Applied Science, NY, Chapter 5, 225–262 (1993); *Federation Series on Coatings Technology: Radiation Cured Coatings*, Federation of Societies for Coatings Technology, Philadelphia, Pa., pages 7–13 (1986); and *Radiation Curing Primer I: Inks, Coatings, and Adhesives*, RadTech International North America, Northbrook, Ill., pages 45–53 (1990).

Isocyanurate derivatives having at least one pendant acrylate group and isocyanate derivatives having at least one pendant acrylate group are further described in U.S. Pat. No. 4,652,274 (Boetcher et al.). Examples of isocyanurate resins with acrylate groups include a triacrylate of tris(hydroxy ethyl) isocyanurate.

Radiation curable aminoplast resins have at least one pendant alpha,beta-unsaturated carbonyl group per molecule or oligomer. These unsaturated carbonyl groups can be acrylate, methacrylate, or acrylamide type groups. Examples of resins with acrylamide groups include N-(hydroxymethyl)-acrylamide, N,N'-oxydimethylenebisacrylamide, ortho- and para-acrylamidomethylated phenol, acrylamidomethylated phenolic novolac, glycoluril acrylamide, acrylamidomethylated phenol, and combinations thereof. These materials are further described in U.S. Pat. Nos. 4,903,440 (Larson et al.), 5,055,113 (Larson et al.), and 5,236,472 (Kirk et al.).

Other suitable ethylenically unsaturated resins include monomeric, oligomeric, and polymeric compounds, typically containing ester groups, amide groups, and acrylate groups. Such ethylenically unsaturated compounds preferably have a molecular weight of less than about 4,000. They are preferably esters made from the reaction of compounds containing aliphatic monohydroxy groups or aliphatic polyhydroxy groups and unsaturated carboxylic acids, such as acrylic acid, methacrylic acid, itaconic acid, maleic acid, and the like. Representative examples of acrylate resins are listed elsewhere herein. Other ethylenically unsaturated resins include monoallyl, polyallyl, and polymethallyl esters and amides of carboxylic acids, such as diallyl phthalate, diallyl adipate, and N,N-diallyladipamide, as well as styrene, divinyl benzene, vinyl toluene. Still others include tris(2-acryloyloxyethyl)-isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

In dual-cure resin systems, the polymerization or crosslinking occur in two separate stages, via either the same or different reaction mechanisms. In hybrid-cure resin systems, two mechanisms of polymerization or crosslinking occur at the same time on exposure to ultraviolet/visible or E-beam radiation. The chemical curing mechanisms that can occur in these systems include, but are not limited to, radical polymerization of acrylic double bonds, radical polymerization of unsaturated polyesters of styrene or other monomers, air drying of allyl functions, cationic curing of vinyl ethers or epoxies, condensation of isocyanates, and acid-catalyzed thermal curing. Thus, the dual-cure and hybrid-cure systems can combine radiation curing with thermal curing, or radiation curing with moisture curing, for example. A combination of E-beam curing with ultraviolet/visible curing is also possible. Combining curing mechanisms can be accomplished, for example, by mixing materials with two types of functionality on one structure or by mixing different materials having one type of functionality. Such systems are discussed in Peeters, "Overview of Dual-Cure and Hybrid-Cure Systems in Radiation Curing," *Radiation Curing in Polymer Science and Technology: Volume III, Polymer Mechanisms*, Fouassier and Rabek, eds., Elsevier Applied Science, NY, Chapter 6, 177–217 (1993).

Of the radiation curable materials, free radical curable materials are preferred. Of these, the acrylates are particularly preferred for use in the seal coat precursors of the present invention. Examples of such materials include, but are not limited to, mono- or multi-functional acrylates (i.e., acrylates and methacrylates), acrylated epoxies, acrylated polyesters, acrylated aromatic or aliphatic urethanes, acrylated acrylics, acrylated silicones, etc., and combinations or blends thereof. These can be monomers or oligomers (i.e., moderately low molecular weight polymers typically containing 2–100 monomer units, and often 2–20 monomer units) of varying molecular weight (e.g., 100–2000 weight average molecular weight). Preferred seal coat precursors include acrylated epoxies, acrylated polyesters, acrylated aromatic or aliphatic urethanes, and acrylated acrylics. More preferred seal coat precursors include acrylated aromatic or aliphatic urethanes, and most preferred seal coat precursors include acrylated aliphatic urethanes.

Free radical radiation curable systems often include oligomers and/or polymers (also often referred to as film formers) that form the backbone of the resultant cured material, and reactive monomers (also often referred to as reactive diluents) for viscosity adjustment of the curable composition. Although the film formers are typically oligomeric or polymeric materials, some monomeric materials are also capable of forming a film. Typically, systems such as these require the use of ultraviolet/visible or E-beam radiation. Ultraviolet/visible curable systems also typically include a photoinitiator. Water or organic solvents can also be used to reduce the viscosity of the system (therefore acting as unreactive diluents), although this typically requires thermal treatment to flash off the solvent. Thus, the seal coat precursors of the present invention preferably do not include water or organic solvents. That is, they are preferably 100% solids formulations.

Preferred seal coat precursors of the present invention include a reactive diluent and a film former. The reactive diluent includes at least one mono- or multi-functional monomeric compound. As used herein, monofunctional means that compound contains one carbon—carbon double bond, and multi-functional means that the compound contains more than one carbon—carbon double bond or another chemically reactive group that can crosslink through condensation. Examples of resins with a carbon—carbon double bond and another chemically reactive group include isocyanatoethyl methacrylate, isobutoxymethyl acrylamide, and methacryloxy propyl trimethoxy silane. Suitable reactive diluents are those typically used in radiation curable systems for controlling viscosity. They are preferably acrylates, although non-acrylates such as n-vinyl pyrrolidone, limonene, and limonene oxide, can also be used, as long as the monomers are ethylenically unsaturated, which provides for their reactivity. The film former includes at least one radiation curable material, such as the mono- or multi-functional oligomeric compounds typically used in radiation curable systems, although thermoplastic polymers can also be used. These thermoplastic polymers may or may not be reactive with the reactive diluent or self-reactive (e.g., internally crosslinkable).

Preferably, the seal coat precursor includes at least one monofunctional monomeric compound and at least one multifunctional oligomeric compound. Most preferably, such seal coat precursors include at least one monofunctional monomeric acrylate having a molecular weight of no greater than about 1000 (preferably, about 100–1000) and at least one multifunctional oligomeric acrylated urethane having a molecular weight of at least about 500, preferably, about 500–7000, and more preferably, about 1000–2000.

Monofunctional monomers typically tend to lower the viscosity of the blend and provide faster penetration into the sealing film and/or structured film. Multifunctional monomers and oligomers (e.g., diacrylates and triacrylates) typically tend to provide more crosslinked, stronger bonds between layers and within the seal coat. Also, depending on their structures, the multifunctional monomers and oligomers can impart flexibility or rigidity to the seal coat. Acrylated oligomers, preferably acrylated urethane oligomers, impart desirable properties to the coating, such as toughness, hardness, and flexibility.

Examples of suitable monofunctional monomers include, but are not limited to, ethyl acrylate, methyl methacrylate, isooctyl acrylate, oxethylated phenol acrylate, isobornyl acrylate, 2-ethylhexyl acrylate, 2-phenoxyethyl acrylate, 2-(ethoxyethoxy)ethyl acrylate, ethylene glycol methacrylate, tetrahydroxy furfuryl acrylate (THF acrylate), caprolactone acrylate, and methoxy tripropylene glycol monoacrylate. Examples of suitable multifunctional monomers include, but are not limited to, triethylene glycol diacrylate, pentaerythritol triacrylate, glycerol triacrylate, glycerol trimethacrylate, glyceryl propoxylate triacrylate, trimethylolpropane trimethacrylate, trimethylolpropane triacrylate, 1,6-hexanediol diacrylate, 1,4-butanediol diacrylate, tetramethylene glycol diacrylate, tripropylene glycol diacrylate, ethylene glycol dimethacrylate, ethylene glycol diacrylate, polyethylene glycol diacrylate, pentaerythritol tetraacrylate, pentaerythritol tetramethacrylate, and 1,6-hexane diacrylate. Other mono- and multifunctional monomers include vinyl acetate, n-vinyl formamide, and others listed below in Table 1. The monomers are available under the trade designations EBECRYL from UCB Radcure Inc., Smyrna, Ga., PHOTOMER from Henkel Corp., Hoboken, N.J., and SARTOMER from Sartomer Co., West Chester, Pa. Limonene oxide is from Aldrich Chemical Co., Milwaukee, Wis. The n-vinyl pyrrolidinone is from Kodak, Rochester, N.Y.

Examples of suitable acrylated oligomers include, but are not limited to, acrylated epoxies, acrylated polyesters, acrylated aromatic or aliphatic urethanes, acrylated silicones, acrylated polyethers, vinyl acrylates, acrylated oils, and acrylated acrylics. Of these, acrylated aromatic or aliphatic urethanes are preferred, and acrylated aliphatic urethanes are more preferred because of their flexibility and weatherability. Examples of some acrylated aliphatic urethanes (i.e., aliphatic urethane acrylates) include those available under the trade designations PHOTOMER 6010 (MW=1500), from Henkel Corp., Hoboken, N.J.; EBECRYL 8401 (MW=1000) and EBECRYL 8402 (MW=1000, urethane diacrylate), from UCB Radcure Inc., Smyrna, Ga.; S-9635, S-9645, and S-9655, all of which contain 25% by weight isobornyl acrylate, and are available from Sartomer Co., West Chester, Pa.; S-963-B80, which contains 20% by weight 1,6-hexanediol diacrylate and is available from Sartomer Co.; and S-966-A80, which contains 20% by weight tripropylene glycol diacrylate and is available from Sartomer Co.

Preferred reactive monomers (i.e., reactive diluents) are those that interact with (e.g., dissolve or swell) the overlay or the sealing film. More preferred monomers are those that interact with both the overlay and the sealing film (e.g., AES and/or ASA films). Particular monomer/film interactions can be readily screened for interaction by application of a quantity of the monomer solution to the surface of the film. Priola et al., *Proceedings of the XIII International Conference in Organic Coatings Science and Technology*, Athens, Greece, Jul. 7–11, 1987, pp. 308–318, discloses a watch glass test suitable for this purpose. A positive response is a hazing or dissolving of the substrate in question upon exposure to a drop of the monomer, which indicates that the monomer penetrates or swells the substance, or otherwise interacts with it. Examples of monomers that interact with a film made from the AES material available the trade designation CENTREX 833 given below in Table 1.

TABLE 1

Screening of Monomers for Compatibility AES/ASA

| Monomer | Type of Material | CENTREX 833 |
| --- | --- | --- |
| EBECRYL 110 | Oxethylated phenol acrylate | yes |
| PHOTOMER 4028 | Bisphenol A ethoxylate diacrylate | none |
| PHOTOMER 4072 | Trimethyol propane propoxylate triacrylate | none |
| PHOTOMER 4149 | Trimethylol propane ethoxylate triacrylate | trace |
| PHOTOMER 8061 | Methoxy tripropylene glycol monoacrylate | trace |
| PHOTOMER 8149 | Methoxy ethoxylated trimethylpropane diacrylate | trace |
| SARTOMER 213 | 1,4-Butanediol diacrylate | yes |
| SARTOMER 238 | 1,6-Hexanediol diacrylate | yes |
| SARTOMER 256 | 2(Ethoxy-ethoxy) ethyl acrylate | yes |

TABLE 1-continued

Screening of Monomers for Compatibility AES/ASA

| Monomer | Type of Material | CENTREX 833 |
|---|---|---|
| SARTOMER 268 | Tetraethylene glycol diacrylate | yes |
| SARTOMER 272 | Triethylene glycol diacrylate | yes |
| SARTOMER 285 | Tetrahydroxy furfuryl acrylate | yes |
| SARTOMER 306 | Tripropylene glycol diacrylate | trace |
| SARTOMER 497 | n-Vinyl formamide | yes |
| SARTOMER 506 | Isobornyl acrylate | none |
| SARTOMER 9008 | Alkoxylated trifunctional acrylate | trace |
| + Limonene oxide | Limonene oxide | yes |
| − Limonene oxide | Limonene oxide | yes |
| NVP | n-Vinyl pyrrolidinone | yes |

As stated above, a thermoplastic polymer can be used as the film former, either in addition to or in place of the mono- or multi-functional oligomers. Thus, many of the sealing film materials (e.g., the AES and/or ASA materials) discussed above can be used in the seal coat precursor. Preferably, these are used in addition to the mono- or multi-functional oligomers as a secondary film former to control the viscosity and rheology of the seal coat precursor and/or to help reduce the amount of shrinkage of the film. Pellets of the various ASA and/or AES resins available under the trade designation CENTREX, for example, are desirable because they will dissolve in a variety of monomers (i.e., reactive diluents), and are radiation curable (e.g., they crosslink upon exposure to ultraviolet/visible radiation). Other thermoplastic polymers can be used, however, that are not reactive either with the reactive diluents or self-reactive. For example, the substantially unreactive thermoplastic acrylate terpolymer used in the binder of U.S. Pat. No. 4,025,159 (McGrath) can be used in the seal coat precursor of the present invention.

The seal coat precursor may contain various solvents other than the diluent monomers discussed above to help solubilize the higher molecular weight reactive resins (e.g., the acrylated oligomers) and/or the polymers of the overlay film and/or the sealing film. Such solvents are referred to as nonreactive diluents or nonreactive monomers as they do not significantly polymerize or crosslink with the reactive resins of the seal coat precursor, for example, under the curing conditions of the method of the present invention. Suitable solvents for this purpose include various ketone solvents, tetrahydrofuran, xylene, and the like. Alternatively, and preferably, however, the seal coat precursor is a 100% solids composition as defined above.

Colorants (i.e., pigments and dyes) can also be included in the seal coat precursor if desired. Examples of suitable colorants include TiO$_2$, phthalocyanine blue, carbon black, basic carbonate white lead, zinc oxide, zinc sulfide, antimony oxide, zirconium oxide, lead sulfochromate, bismuth vanadate, bismuth molybdate, as well as other pigments, particularly opaque pigments disclosed in U.S. Pat. No. 5,272,562 (Coderre). The colorant can be used in an amount to impart the desired color, and can be added to the seal coat precursor in a variety of ways. For example, the colorant may be included in the ASA and/or AES pellets as purchased. Typically, and preferably, a pigment is used in the form of a dispersion in, for example, neopentyl glycol diacrylate (available under the trade designation 9WJ, from Penn Color, Doylestown, Pa.).

Preferably, the seal coat precursors include a reactive diluent in an amount of about 5-25 wt-%, based on the weight of the total seal coat precursor. The amounts of the film former and optional pigment in the seal coat precursor depends on the desired opacity, flexibility, viscosity, etc. Preferably, the seal coat precursors include a film former in an amount of about 25-95 wt-%, and pigment in an amount of no greater than about 50 wt-%, based on the total weight of the seal coat precursor.

A photoinitiator is typically included in ultraviolet/visible curable seal coat precursors of the present invention. Illustrative examples of photopolymerization initiators (i.e., photoinitiators) include, but are not limited to, organic peroxides, azo compounds, quinones, benzophenones, nitroso compounds, acryl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Specific examples include benzil, methyl o-benzoate, benzoin, benzoin ethyl ether, benzoin isopropyl ether, benzoin isobutyl ether, benzophenone/tertiary amine, acetophenones such as 2,2-diethoxyacetophenone, benzyl methyl ketal, 1-hydroxycyclohexylphenyl ketone, 2-hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyl-diphenylphosphine oxide, 2-methyl-1-4(methylthio), phenyl-2-morpholino-1-propanone, bis(2,6-dimethoxybenzoyl)(2,4,4-trimethylpentyl)phosphine oxide, etc. Such photoinitiators include those available under the trade designations DAROCUR 4265 (50:50 blend of 2-hydroxy-2-methyl-1-phenylpropan-1-one and 2,4,6-trimethylbenzoyldiphenylphosphine oxide) and CGI1700 (25:75 blend of bis(2,6-dimethoxybenzoyl)-2,4,4-trimethylpentylphosphine and 2-hydroxy-2-methyl-1-phenylpropan-1-one) available from Ciba-Geigy Corp., Ardsley, N.Y. Typically, a photoinitiator is used in an amount to impart desired reaction rates. Preferably, it is used in an amount of about 0.01-5 wt-%, and more preferably about 0.1-1 wt-%, based on the total weight of the seal coat precursor.

Other additives that can be included within the seal coat precursor are fillers, defoamers, adhesion promoters, flattening agents, wetting agents, slip aids, stabilizers, plasticizers, adhesion promoters, etc. These can be reactive or nonreactive; however, they are typically nonreactive. Examples of reactive plasticizers are available under the trade designations SARBOX SB-600 and SB-510E35 from Sartomer Co. Typically, such additives are used in amounts to impart desired characteristics. Preferably, they are used in amounts of about 0.01-5 wt-%, and more preferably about 0.1-1 wt-%, based on the total weight of the seal coat precursor.

Any suitable method of applying the seal coat precursor to the sealing film can be used in connection with the present invention. Preferably, however, the coating method is one that is capable of causing the seal coat precursor to contact the overlay film and even "fill" the depressions caused by the seal legs. The choice of coating method will depend on the viscosity of the seal coat precursor, the depth of the depressions, the desired thickness of the coating, coating speed, etc. Suitable coating methods include, for example, knife coating, rod coating, and notch bar coating. The thickness of the seal coat will depend on the viscosity and film build of the seal coat precursor, the type of coater used, and the desired final properties. Typically, wet coating thicknesses of about 10-250 micrometers are used. Some useful methods of applying a layer of the seal coat used in the present invention are described in U.S. Pat. Nos. 4,327,130; 4,345,543; 4,387,124; and 4,442,144 (all to Pipkin).

After the seal coat precursor is coated onto the sealing film/structured film/overlay construction, it is preferably exposed to an energy source to initiate cure. Examples of suitable and preferred energy sources include thermal energy and radiation energy. The amount of energy depends upon several factors such as the resin chemistry, the dimensions of the seal coat precursor after it is coated, and the amount and type of optional additives, particularly pigment load. For thermal energy, the temperature is about 30° C. to about 100° C. The exposure time can range from about 5 minutes to over 24 hours, longer times being appropriate for lower temperatures.

Suitable radiation energy sources for use in the invention include electron beam, ultraviolet light, visible light, or combinations thereof. Electron beam radiation, which is also known as ionizing radiation, can be used at an energy level of about 0.1–10 Mrad, preferably, at an energy level of about 3–8 Mrad, and more preferably, about 5–6 Mrad; and at an accelerating voltage level of about 75 KeV to about 5 meV, preferably, at an accelerating voltage level of about 100–300 KeV. Ultraviolet radiation refers to nonparticulate radiation having a wavelength within the range of about 200 nanometers to about 400 nanometers. It is preferred that 118–236 watts/cm ultraviolet lights are used. Visible radiation refers to nonparticulate radiation having a wavelength within the range of about 400 nanometers to about 800 nanometers. If radiation energy is employed, some pigment particles and/or other optional additives may absorb the radiation energy to inhibit polymerization of the resin in the seal coat precursor. If this is observed, higher doses of radiation, energy and/or higher levels of photoinitiator can be used to the extent needed to compensate for such radiation absorbance. Also, the E-beam accelerating voltage may be increased to thereby increase penetration of the ionizing radiation energy.

All patents, patent applications, and publications cited herein are each incorporated herein by reference in their entirety, as if individually incorporated by reference. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A retroreflective article comprising:
   a) an ultra-flexible structured retroreflective sheeting having a front surface and a back surface, the sheeting retroreflecting light entering through the front surface, wherein the sheeting comprises an overlay film, a two-dimensional array of substantially independent structured elements bonded to the overlay film, and a sealing film forming the back surface of the sheeting and bonded to the overlay film between the structured elements;
   b) a plurality of indentations in the sealing film; and
   c) a seal coat located on the sealing film, wherein the seal coat at least partially fills the indentations in the sealing film.

2. A retroreflective article according to claim 1, wherein the seal coat substantially fills the indentations.

3. A retroreflective article according to claim 1, wherein the seal coat is prepared from reactive components.

4. A retroreflective article according to claim 1, wherein the seal coat contacts the overlay film in at least one of the indentations.

5. A retroreflective sheeting according to claim 1, wherein the sealing film comprises a thermoplastic polymer.

6. A retroreflective article according to claim 5, wherein the sealing film has a ductile yield of at least about 20%.

7. A retroreflective sheeting according to claim 6, wherein the sealing film comprises a thermoplastic polymer selected from the group consisting of cast polyethers, cast polyesters, cast polyamides, ionomeric ethylene copolymers, plasticized vinyl halide polymers, styrene-acrylonitrile copolymers, poly-alpha-olefins, ethylene-propylene-diene copolymers, and combinations or blends thereof.

8. A retroreflective sheeting according to claim 7, wherein the sealing film comprises a thermoplastic polymer selected from the group consisting of ethylene-propylene-nonconjugated diene ternary copolymers grafted with a mixture of styrene and acrylonitrile, styrene-acrylonitrile graft copolymers, acrylonitrile-butadiene-styrene graft copolymers, extractable styrene-acrylonitrile copolymers, and blends thereof.

9. A retroreflective sheeting according to claim 1, wherein the seal coat is prepared from a seal coat precursor comprising a thermally curable component.

10. A retroreflective sheeting according to claim 1, wherein the seal coat is prepared from a seal coat precursor comprising a radiation curable component.

11. A retroreflective sheeting according to claim 10, wherein the radiation curable component comprises a cationic curable resin, a free radical curable resin, or mixtures thereof.

12. A retroreflective sheeting according to claim 10, wherein the radiation curable component comprises a dual-cure resin or a hybrid-cure resin.

13. A retroreflective sheeting according to claim 10, wherein the radiation curable component comprises an acrylate.

14. A retroreflective sheeting according to claim 13, wherein the acrylate is selected from the group consisting of an acrylated epoxy, an acrylated polyester, an acrylated aromatic or aliphatic urethane, an acrylated acrylic, an acrylated silicone, an acrylated polyether, a vinyl acrylate, and an acrylated oil.

15. A retroreflective sheeting according to claim 14, wherein the acrylate is an acrylated aliphatic or aromatic urethane.

16. A retroreflective sheeting according to claim 15, wherein the acrylate is an acrylated aliphatic urethane.

17. A retroreflective sheeting according to claim 16, wherein the seal coat precursor further comprises a monofunctional or multifunctional reactive monomer.

18. A retroreflective sheeting according to claim 17, wherein the monofunctional or multifunctional reactive monomer is an acrylate monomer.

19. A retroreflective sheeting according to claim 10, wherein the seal coat precursor comprises a reactive diluent and a film former.

20. A retroreflective sheeting according to claim 19, wherein the reactive diluent comprises a monofunctional or multifunctional acrylate monomer.

21. A retroreflective sheeting according to claim 19, wherein the film former comprises a thermoplastic polymer.

22. A retroreflective sheeting according to claim 19, wherein the film former comprises a monofunctional or multifunctional acrylate oligomer.

23. A retroreflective sheeting according to claim 19, wherein the seal coat precursor further comprises a multiphase styrenic thermoplastic copolymer.

24. A retroreflective article comprising:

a) an ultra-flexible structured retroreflective sheeting having a front surface and a back surface, the sheeting retroreflecting light entering through the front surface, wherein the sheeting comprises an overlay film, a two-dimensional array of substantially independent structured elements bonded to the overlay film, and a sealing film having a ductile yield of at least about 20% forming the back surface of the sheeting and bonded to the overlay film between the structured elements;

b) a plurality of indentations in the sealing film; and c) a seal coat located on the sealing film, wherein the seal coat at least partially fills the indentations in the sealing film, and further wherein the seal coat is prepared from a seal coat precursor comprising radiation curable components.

25. A retroreflective sheeting according to claim 24, wherein the radiation curable component comprises a free radical curable resin.

26. A retroreflective sheeting according to claim 24, wherein the sealing film comprises a thermoplastic polymer selected from the group consisting of ethylene-propylene-nonconjugated diene ternary copolymers grafted with a mixture of styrene and acrylonitrile, styrene-acrylonitrile graft copolymers, acrylonitrile-butadiene-styrene graft copolymers, extractable styrene-acrylonitrile copolymers, and combinations or blends thereof.

27. A retroreflective sheeting according to claim 26, wherein the seal coat precursor comprises a reactive diluent and a film former.

28. A retroreflective sheeting according to claim 27, wherein the reactive diluent comprises a monofunctional or multifunctional acrylate monomer.

29. A retroreflective sheeting according to claim 27, wherein the film former comprises a monofunctional or multifunctional acrylate oligomer.

30. A method of manufacturing retroreflective sheeting comprising:

a) providing an ultra-flexible structured retroreflective sheeting having a front surface and a back surface, the sheeting retroreflecting light entering through the front surface, wherein the sheeting comprises an overlay film, a two-dimensional array of substantially independent structured elements bonded to the overlay film, a sealing film forming the back surface of the sheeting and bonded to the overlay film between the structured elements, and a plurality of indentations in sealing film;

b) at least partially filling the indentations in the sealing film with a seal coat precursor; and c) solidifying the seal coat precursor.

31. A method according to claim 30, wherein the seal coat precursor comprises a radiation curable component.

32. A method according to claim 31, wherein the step of solidifying comprises exposing the seal coat precursor to E-beam radiation.

* * * * *